Sept. 13, 1966  D. R. HARTING  3,272,003

FATIGUE LIFE GAGING METHODS

Filed Jan. 27, 1964

INVENTOR.
DARRELL R. HARTING ated Sept. 13, 1966

3,272,003
FATIGUE LIFE GAGING METHODS
Darrell R. Harting, Seattle, Wash., assignor to The Boeing Company, Seattle, Wash., a corporation of Delaware
Filed Jan. 27, 1964, Ser. No. 340,331
6 Claims. (Cl. 73—91)

This invention relates generally to materials testing and more particularly to a method for measuring the cumulative fatigue damage or remaining fatigue life in a structure which is subjected to repeated loading.

Previous attempts to measure remaining fatigue life have been made utilizing ultrasonic devices, and investigating physical changes in the material of which the structure is composed. These prior methods have failed because they are either difficult to apply to a localized area or surface of the structure, or, in the latter case, because the test is destructive, and because the relationships between the results obtained and the desired fatigue life information are obscure and subject to different interpretations.

This invention broadly consists of a fatigue life gage which may be formed of a resistance element that is fabricated to possess characteristics specifically correlated with the fatigue life of the base structure whose fatigue life is to be indicated. The gage, when placed on the base structure and subjected to the same cyclic forces acting thereon, will undergo a finite and permanent change in the resistance or temperature coefficient of the gage. The change in resistance or temperature coefficient will be directly related to the change in fatigue life remaining in the gage and in the base structure, so that at any time an indication of remaining fatigue life in the base structure may be obtained by measuring the resistance of the gage element.

Therefore, it is an object of this invention to provide a method for measuring the remaining fatigue life in an associated structure.

A further object of this invention is to provide a method for measuring the cumulative fatigue damage of a structure subjected to repeated loading.

Another object of the invention is to provide a method for determining fatigue life at the surface of the associated structure.

Another object of the invention is to provide a method for determining fatigue life utilizing a grid of conductive material which is mounted on the structure to be tested by means of adhesives, welds, or other structural fastening method.

Another object of the invention is to provide a method for determining fatigue life utilizing a grid of conductive material in the form of a foil, film or wire mounted on a structure to be tested wherein the change in resistance or temperature coefficient of resistance of the grid material is utilized in determining the fatigue life of the structure.

Figure 1:
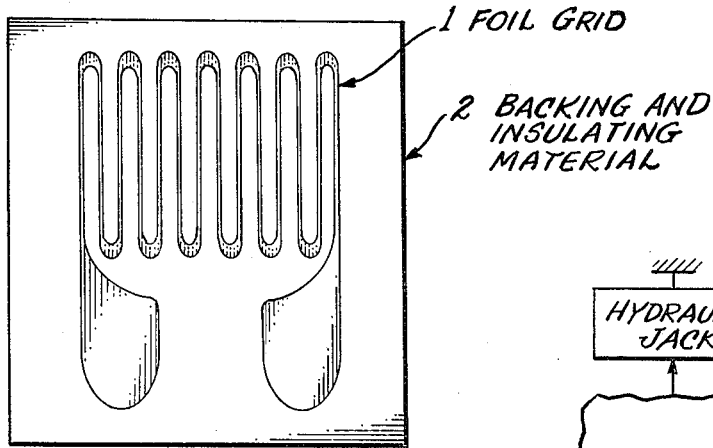
Figure 2:
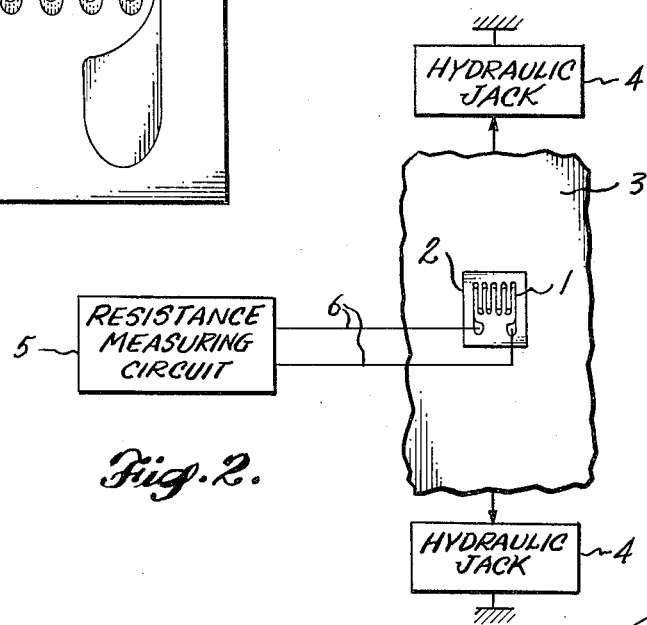
Figure 3:
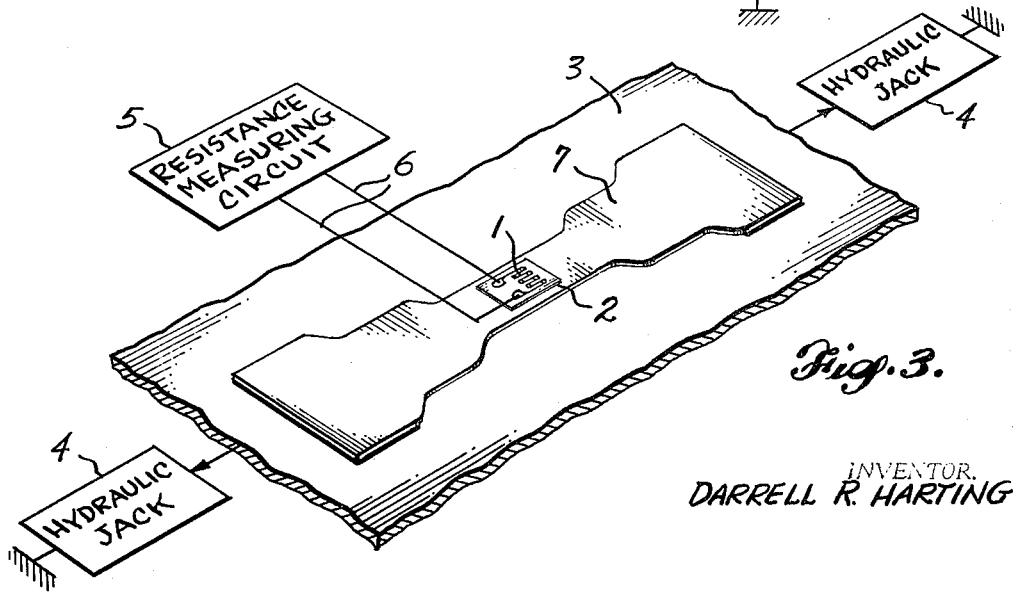

Other objects of the invention not specifically set forth above will become readily apparent from the following description and drawing in which:

FIGURE 1 is a diagrammatic view of an embodiment of a fatigue life gage useable in the present inventive method;

FIGURE 2 is a diagrammatic view illustrating the gage of FIGURE 1 being employed to measure the fatigue damage done to a loaded structure, wherein the gage is mounted directly on the loaded structure; and FIGURE 3 is a diagrammatic view, similar to FIGURE 2, showing the gage of FIGURE 1 being employed to measure the fatigue damage done to a loaded structure, wherein the gage is mounted on a strain multiplier which is mounted on the loaded structure.

The strain gage shown and described in the drawings comprises a grid of conductive material in the form of a foil, 1 mounted upon a backing of insulating material 2. The gage may be mounted directly on the structure 3 to be tested by means of adhesives, welds, or other structural fastening method, as shown in FIGURE 2; or, alternatively, the gage may be mounted on a suitable strain multiplier 7 which is, in turn, mounted on the structure 3, as shown in FIGURE 3. When the structure 3 is loaded (by any suitable means, such as hydraulic jacks 4, 4), strain in the surface of the structure is transmitted to the conductive grid 1. Repeated straining of the grid material will permanently change the electrical resistance and/or temperature coefficient of resistance of the grid material. The change in resistance or temperature coefficient of resistance of the grid material may be easily calculated from data obtained by measuring the resistance or the change in resistance of the grid under conditions of known strain and temperature levels after the test structure has been subjected to repeated loading. These resistance or temperature coefficient measurements may be made by any suitable conventional device, such as a resistance measuring circuit 5 connected to the ends of grid 1 by leads 6, 6.

Because the permanent change in resistance or temperature coefficient with fatigue of the grid 1 is a function of the grid material, grid configuration and physical dimensions, heat-treat, cold-work and residual stress in the grid material, changes in these parameters may be made as required to produce the required characteristics of the fatigue gage.

While the grid has been shown here as a foil, it may be of any conductive material in the form of a film or wire, for example: constantan, Nichrome, Karma, isoelastic, or any other material used as a resistive element; aluminum, steel, stainless steel, magnesium, titanium, or any other structural material.

Tests have been conducted on fatigue life gages of soft constantan foil, backed and faced by Bakelite impregnated glass paper with ribbon leads, about 0.25 x 0.60 x 0.006 inch, with a nominal resistance of 500 ohms and nominal gage factor (as a strain gage) of 2.06. The gages tested had a thermal output coefficient (temperature coefficient of resistance expressed as apparent strain degree F.) of about $-3$ micro-strain per degree F. before testing and were installed on 2024–T351 aluminum specimens with EPY150 epoxy cement under a pressure of 90 p.s.i. with a maximum curing temperature of 175° F. The specimens were tension-tension fatigue tested at maximum stress levels of 40,000, 35,000, and 30,000 p.s.i. (4,000, 3,500, and 3,000 micro-strain) with a ratio (R) of minimum to maximum stress of $+.02$ and tension-compression fatigue tested at a maximum of 36,700 p.s.i. tension, minimum of 10,700 p.s.i. compression ($+3,670$ to $-1,070$ microstrain, R=$-.29$). The tests were run at room temperature with constant amplitude cyclic loading.

The tests showed that the slopes of the curves (not shown) of resistance change vs. the logarithm of the number of cycles are constant above 10,000 cycles. The slopes (not shown) in ohms per decade of applied load cycles resulting from the tension-tension tests (R=$+.02$) are proportional to the difference between the maximum stress level applied and a constant (25,000 p.s.i.). The thermal output coefficients of the gages changed during testing from about $-3$ microstrain per degree F. to about $-10$ microstrain per degree F.

When the test curves (not shown) of resistance change vs. the logarithm of the number of cycles are extrapolated to the numbers of cycles required to fail 2024 aluminum as indicated by S–N curves, it is apparent that for a ratio of maximum to minimum stress of $+.02$ the fatigue gage would have changed resistance by about 22 ohms (with a tolerance of less than 10%). If this relationship were to hold for all stress ratios, the gage should integrate fatigue damage under random loading if it is assumed that fatigue damage varies (before failure) with cycling in the same manner as resistance change.

It has thus been shown that the remaining fatigue life in aluminum can be determined by the fatigue life gage of the invention when utilizing a grid of constantan foil, thereby indicating that it is not always necessary to utilize a grid of the same material as the material being tested.

The tests conducted on aluminum using a gage of constantan foil clearly indicated that (1) the permanent resistance change resulting from fatigue loading at a constant amplitude of alternating strain is a function of the number of applied cycles, (2) that this resistance change is large enough to be easily measured, (3) that the rate of change of resistance with cycling is a function of the maximum strain level and the ratio of minimum to maximum strain, and (4) the gages subjected to the same loading pattern would change resistance by the same amount within a reasonable tolerance for fatigue work (10–15 percent).

It has thus been shown that this invention provides a fatigue life gage which (1) can be applied to a local area of the test structure, (2) can measure the fatigue damage at the surface of the structure, therefore is useful in predicting the remaining fatigue life of the structure. Its response is not influenced by irrelevant characteristics of the structure, for example, discontinuities on the surface opposite the point of application, (3) can be made in various shapes and size to satisfy particular requirements, (4) is non-destructive, (5) the output can be made to be affected by random loading to the same extent as the structure, eliminating the requirement for knowing a theoretical relationship between the effects of random verses constant level loading, and (6) may be installed on a strain multiplier or basic structure at a location other than that at which fatigue damage measurements are required, fatigue damage at the required location being determined from gage measurements if the relationship between stress or strain levels at the fatigue gage location and the desired location are known.

Although a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What I claim is:

1. The method of measuring the cumulative fatigue damage at an area on a structure which is subjected to repeated loading comprising the steps of mounting a grid of conductive material on the structure to be tested so that strains in the test structure are transmitted to the grid, subjecting the structure to repeated loading which causes a permanent and finite change in the electrical resistance of the grid, measuring the change in the resistance of the grid, and determining the fatigue life of the structure by comparing the change in resistance with fatigue life data on the grid material obtained under known conditions.

2. The method of determining the fatigue life of a structure under repeated loading comprising the steps of fastening a grid of electrical conductive material to a structure to be tested so that strains in the test structure are transmitted to the grid, subjecting the structure to repeated loading which causes permanent and finite changes in the temperature coefficient of resistance of the grid, measuring the change in the temperature coefficient of resistance of the grid, and determining the fatigue life of the structure by data obtained on the fatigue life of the grid material under conditions of known strain and temperature levels.

3. The method defined in claim 1 including the step of changing the rate of change of resistivity of the grid by attaching the grid to the structure under a condition of known pre-strain.

4. The method defined in claim 1 including the step of changing the rate of change of resistivity of the grid by attaching the grid to a strain-multiplier, and attaching the strain-multiplier to the structure.

5. The method defined in claim 2 including the step of changing the rate of change of temperature coefficient of the grid by attaching the grid to the structure under a condition of known pre-strain.

6. The method defined in claim 2 including the step of changing the rate of change of temperature coefficient of the grid by attaching the grid to a strain-multiplier, and attaching the strain-multiplier to the structure.

References Cited by the Examiner

UNITED STATES PATENTS

| | | | |
|---|---|---|---|
| 2,449,883 | 9/1948 | De Forest | 73—88.5 X |
| 2,553,986 | 5/1951 | Statham | 324—65 X |
| 2,920,480 | 1/1960 | Haas | 73—88 |
| 3,060,728 | 10/1962 | Wolber | 73—86 |

FOREIGN PATENTS 150,281   1962   Russia.

RICHARD C. QUEISSER, *Primary Examiner.*

CHARLES A. RUEHL, *Assistant Examiner.*